UNITED STATES PATENT OFFICE.

WILLIAM F. DOERFLINGER, OF STATEN ISLAND, NEW YORK.

PYROXYLIN COMPOSITION AND PROCESS OF MAKING SAME.

1,320,458.	Specification of Letters Patent.	Patented Nov. 4, 1919.

No Drawing.	Application filed December 6, 1918. Serial No. 265,502.

*To all whom it may concern:*

Be it known that I, WILLIAM F. DOERFLINGER, a citizen of the United States, residing at Staten Island, in the county of Richmond and State of New York, have invented certain new and useful Improvements in Pyroxylin Compositions and Processes of Making Same, of which the following is a specification.

My invention relates to the manufacture of pyroxylin compositions containing oils such as is required where a very flexible film or coating is desired. The invention involves the use of a solvent for the pyroxylin comprising diacetone alcohol, which is an excellent solvent of pyroxylin and imparts many desirable qualities to solutions of pyroxylin of which it is a component. Among its useful properties for the purpose may be mentioned the fact that it is what is known as a non-blushing solvent, that is, pyroxylin does not tend to precipitate out of a solution in diacetone alcohol to make a white or mottled film as is the case with some solvents when the humidity is above a certain degree. Diacetone alcohol also tends to produce a desirable rate of evaporation of the solution, is ordinarily comparatively cheap, and has the further advantage that a comparatively small amount of the same is necessary per gallon of mixed solvent.

Solutions of nitrocellulose in solvents comprising diacetone alcohol have heretofore been widely used in the arts, but their field has been greatly restricted by the fact that it has been impossible to incorporate oils in such solutions, producing compositions which would dry to homogeneous films. All attempts to do this hitherto have resulted in compositions which when spread and allowed to evaporate resulted in non-homogeneous films or coatings, which were weak, sticky and cloudy or spotted. This was because of the separation of the oil usually in the later stages of drying, the oil apparently being thrown out of intimate association with the nitrocellulose. This phenomenon, sometimes known as "spewing out the oil," is the more remarkable when it is known that diacetone alcohol is a good solvent for pyroxylin and apparently for the oils commonly used in conjunction with nitrocellulose, such, for instance, as castor oil.

For many purposes, such as leather coating, manufacture of artificial leather (cloth backing coated with nitrocellulose composition), and in fact most purposes where a very flexible film or coating is desired, the presence of oil homogeneously combined with the pyroxylin, so that the oil will not separate from the pyroxylin on evaporation of the volatile solvent, is essential. No one has, so far as I am aware, hitherto been able to produce such solutions with solvents of which diacetone alcohol is a component.

I have found that compositions of pyroxylin, non-drying oils, and volatile solvents containing diacetone alcohol, which will evaporate to form homogeneous films without separation of oil and pyroxylin, may be produced by incorporating with the diacetone alcohol and oil a suitable blending agent. By this term I mean to indicate a substance which when incorporated into a solution containing pyroxylin, non-drying oil, and diacetone alcohol, will prevent the oil and pyroxylin from separating on drying, and which will cause the pyroxylin and oil to remain as a homogeneous film when a layer of the composition is allowed to evaporate and dry. The blending agent may be a single chemical substance, or a mixture of several. I have found normal butyl alcohol to be a particularly desirable blending agent, but it is desirable to use with the butyl alcohol more or less of a good pyroxylin solvent, which may in itself be a blending agent, such as, for instance, butyl acetate, light acetone oil (a commercial distillate consisting mainly of ketones boiling between 90° C. and 130° C.,) amyl acetate or amyl alcohol; or which is not itself a blending agent or has only weak blending power, such as methyl-ethyl ketone, acetone, ethyl acetate, methyl-acetate, methyl alcohol, or the commercial mixture which is known as "methyl-acetone." Butyl alcohol is an alcohol of comparatively high boiling point, namely, approximately 116° C. It is not itself a solvent of pyroxylin, but will be taken in large proportions into solvent mixtures containing pyroxylin.

My invention accordingly comprises the method of producing the solutions suitable for producing homogeneous films and coatings, which consists in so treating a solution containing pyroxlyin, oil and diacetone alcohol that the oil and pyroxylin will not separate on the evaporation of the volatile ingredients of the composition; the production of a homogeneous volatile solvent containing diacetone alcohol and a blending agent which will dissolve pyroxylin and non-drying oil to form solutions which will dry without separation or local concentration of the oil, and the production of a solution of pyroxylin and non-drying oil in a volatile solvent, such as that just referred to, containing diacetone alcohol and a blending agent.

The blending agent should be a solvent for the particular oil used, under the conditions of the composition and its conditions of use; it should have a certain affinity for pyroxylin, but may be alone a non-solvent for pyroxylin as, for instance, normal butyl alcohol, or a solvent, as, for instance, butyl or amyl acetate. Butyl alcohol is a particularly desirable blending agent because it has a desirable rate of evaporation, neither too fast or too slow, and because it has only a faint and agreeable odor, and does not impart an objectionable clinging solvent odor to the film, resulting from the use of the composition.

The amount of blending agent which it is desirable to use will depend upon the particular blending agent selected, the nature of the composition, the amount of pyroxylin, diacetone alcohol, and oil, and the particular oil used. It will also be influenced by other components which may be present, such as, for instance, gum resins, etc. If the composition is to be used with forced drying it is desirable to use more blending agent than would be necessary if it were to be allowed to dry at ordinary temperature, out of a direct draft. It is also desirable to use more blending agent if several successive coats of the composition are to be applied. For instance, a composition consisting of one-half pound of pyroxylin, one and one-half pounds of castor oil, one-tenth of a gallon of diacetone alcohol, four-tenths of a gallon of acetone and five-tenths of a gallon of benzol, forms a clear bright solution, but if a layer be allowed to evaporate the oil and the pyroxylin separate, forming a white, streaky weak film due to the spewing of the oil. If, however, one-eighth of a gallon of butyl alcohol, or of amyl acetate be added to the composition, layers dry to bright, homogeneous films, the spewing of the oil being entirely prevented. To entirely prevent this spewing with a blending agent consisting of light acetone oil, (so called " white oil,") at least thirty-five-one-hundredths of a gallon should be used.

The process may be greatly varied to meet specific requirements. As an example of my process I produce a composition suitable for coating leather, particularly splits, by dissolving forty pounds of pyroxylin and forty pounds of castor oil in twenty-eight gallons of methyl-ethyl ketone, five gallons of diacetone alcohol, twenty-five gallons of normal butyl alcohol and forty-two gallons of benzol. In this composition the methyl-ethyl ketone may be replaced by certain other substances as stated, such as methyl alcohol, methyl acetate, ethyl acetate, acetone, or " methyl acetone," etc.

Another good composition, for example, may be made by dissolving fifty pounds of pyroxylin and one hundred pounds of boiled, blown rape seed oil in thirty gallons of ethyl acetate, four gallons of diacetone alcohol and fifty gallons of benzol, and sixteen gallons of butyl acetate.

Such compositions, when applied to a suitable support, such as, for instance, leather, and allowed to evaporate and dry leave clear, homogeneous films or coatings which are not sticky and without separating out oil, such as are entirely suitable for the particular purpose for which they are intended. Successive coatings of these compositions may be applied without any separation or irregular concentration of oil in the composite finish. Other materials, such as, for instance, dyes or pigments may be incorporated in the composition to produce particular technical effects, and the composition and relative proportions may be greatly varied as will be evident to those skilled in the art.

The oil contained in the composition may be a liquid glycerid, such as castor oil or other nondrying oil of the character referred to above. An excess of butyl alcohol over the proportion necessary to prevent separation of the oil and pyroxylin on evaporation of the composition is often useful as an excellent filler of the solvent mass, by the use of which the rate of evaporation of the whole mass may be desirably controlled. The film or coating which is left after the evaporation of the volatile ingredients comprises pyroxylin and the oil, apparently in solid solution, traces of the various solvents also possibly being included.

What I claim is:—

1. As a new composition of matter, a solution of pyroxylin and a non-volatile liquid glycerid in a volatile solvent containing diacetone alcohol and a blending agent having the property of preventing the separation of the non-volatile glycerid from the pyroxylin upon evaporation of the volatile solvent.

2. As a new composition of matter, a solution of pyroxylin and a non-drying oil in a volatile solvent containing diacetone alcohol, said composition being adapted to form a firm homogeneous film or coating containing pyroxylin and said oil, without separation of the oil upon the evaporation of the volatile solvent.

3. As a new composition of matter, a solution of pyroxylin and an oil in a volatile solvent containing diacetone alcohol and butyl alcohol, said composition being adapted to form a homogeneous film or coating on drying.

4. As a new composition of matter, a solution of pyroxylin and a non-drying oil in a volatile solvent comprising diacetone alcohol, a blending agent, and diluent volatile liquid, which will leave a homogeneous film or coating of pyroxylin and oil, on drying.

5. As a new composition of matter, a coating composition comprising pyroxylin, a non-drying oil, adapted to impart flexibility to the dried film or coating, diacetone alcohol, and a blending agent.

6. As a new composition of matter, a coating composition comprising pyroxylin, a non-drying oil, diacetone alcohol, and normal butyl alcohol.

7. As a new composition of matter, a homogeneous volatile solvent containing diacetone alcohol and butyl alcohol, which solvent will dissolve pyroxylin and non-drying oil, forming solutions which will dry without separation or local concentration of the oil.

8. As a new composition of matter, a homogeneous volatile solvent containing diacetone alcohol and a blending agent, which solvent will dissolve pyroxylin and non-drying oil, forming solutions which will dry without separation or local concentration of the oil.

9. As a new composition of matter, a homogeneous volatile solvent containing diacetone alcohol, butyl alcohol and a low-boiling pyroxylin solvent, which solvent will dissolve pyroxlin and non-drying oil, forming solutions which will dry without separation or local concentration of the oil.

10. As a new composition of matter, a homogeneous volatile solvent containing diacetone alcohol, butyl alcohol, a low-boiling pyroxylin solvent, and a diluent which homogeneous volatile solvent will dissolve pyroxylin and non-drying oil, forming solutions which will dry without separation or local concentration of the oil.

11. As a new composition of matter, a homogeneous volatile solvent containing diacetone alcohol, butyl alcohol and a volatile ketone, which solvent will dissolve pyroxylin and non-drying oil, forming solutions which will dry without separation or local concentration of the oil.

12. As a new composition of matter, a coating composition comprising a non-drying oil and pyroxylin dissolved in a volatile solvent containing diacetone alcohol, normal butyl alcohol and a low-boiling pyroxylin solvent.

13. As a new composition of matter, a coating composition comprising a non-drying oil and pyroxylin dissolved in a volatile solvent containing diacetone alcohol, normal butyl alcohol, a low-boiling pyroxlyin solvent and a diluent.

14. As a new composition of matter, a coating composition comprising a non-drying oil and pyroxylin dissolved in a volatile solvent containing diacetone alcohol, normal butyl alcohol and a volatile ketone.

15. As a new composition of matter, a coating composition comprising a non-drying oil and pyroxylin dissolved in a volatile solvent containing diacetone alcohol, normal butyl alcohol, a volatile ketone, and benzol.

16. As a new composition of matter, a coating composition comprising castor oil and pyroxylin dissolved in a volatile solvent containing diacetone alcohol and a blending agent.

17. The process of producing solutions suitable for lacquers, varnishes, and producing films and coatings, which consists in dissolving pyroxylin, and a non-drying oil in a volatile solvent containing diacetone alcohol and a blending agent which will prevent the oil and pyroxylin separating on evaporating the volatile portion of the composition.

18. The process of producing compositions suitable for lacquers and varnishes and for producing films and coatings which consists in dissolving pyroxylin and a non-drying oil in a volatile solvent containing diacetone alcohol and butyl alcohol in such relative amounts that the oil and pyroxylin will form a homogeneous film on drying a layer of the composition.

This specification signed and witnessed this 4th day of December, 1918.

WILLIAM F. DOERFLINGER.

Witnesses:
DYER SMITH,
I. McINTOSH.